(12) United States Patent
Furumura et al.

(10) Patent No.: US 8,178,415 B2
(45) Date of Patent: May 15, 2012

(54) METHOD FOR MANUFACTURING RF POWDER

(75) Inventors: Yuji Furumura, Yokohama (JP); Naomi Mura, Tokyo (JP); Shinji Nishihara, Kokubunji (JP); Katsuhiro Fujino, Yokohama (JP); Katsuhiko Mishima, Yokohama (JP); Susumu Kamihashi, Yokohama (JP)

(73) Assignee: Philtech, Inc., Tokyo (JP)

( * ) Notice: Subject to any disclaimer, the term of this patent is extended or adjusted under 35 U.S.C. 154(b) by 240 days.

(21) Appl. No.: 12/516,493

(22) PCT Filed: Nov. 26, 2007

(86) PCT No.: PCT/JP2007/072746
§ 371 (c)(1),
(2), (4) Date: Oct. 20, 2009

(87) PCT Pub. No.: WO2008/065988
PCT Pub. Date: Jun. 5, 2008

(65) Prior Publication Data
US 2010/0081235 A1    Apr. 1, 2010

(30) Foreign Application Priority Data

Nov. 27, 2006  (JP) .................................. 2006-318530

(51) Int. Cl.
*H01L 21/00* (2006.01)
(52) U.S. Cl. ........................................ 438/360; 438/113
(58) Field of Classification Search .................. 438/113, 438/360
See application file for complete search history.

(56) References Cited

U.S. PATENT DOCUMENTS

| | | |
|---|---|---|
| 3,946,206 A | 3/1976 | Darjany |
| 4,058,839 A | 11/1977 | Darjany |
| 4,745,401 A | 5/1988 | Montean |

(Continued)

FOREIGN PATENT DOCUMENTS

JP     61-006783     1/1986

(Continued)

OTHER PUBLICATIONS

The International Search Report issued in PCT/JP2007/072746 mailed on Feb. 19, 2008 (with English translation).

(Continued)

*Primary Examiner* — Fernando L Toledo
(74) *Attorney, Agent, or Firm* — Foley & Lardner LLP

(57) ABSTRACT

A method for manufacturing RF powder wherein the RF powder is composed of a large amount of particles and used as collective RF powder (a powdery entity); and a large amount of RF powder particles can be obtained from a wafer in a stable manner and at a high yield is provided.

The method for manufacturing RF powder is a method for manufacturing RF powder composed of a large amount of particles 11a each having a substrate 12 and a magnetic coupling circuit device 15. This method includes a step S11 of forming many antenna circuit devices 39 on a wafer 40; a gas dicing step S13 for drawing dicing grooves on a wafer to locate positions of separation of magnetic coupling circuit devices; a protection film formation step S14 for coating surrounding areas of the magnetic coupling circuit devices with a protection film; a reinforcement step S15 for attaching the wafer to a supporting plate using an adhesive sheet; a grinding step S16 for grinding the backside of the wafer until the dicing grooves are reached; and a separation step S17 for separating the circuit devices by removing the supporting plate.

14 Claims, 13 Drawing Sheets

U.S. PATENT DOCUMENTS

| | | | |
|---|---|---|---|
| 5,204,681 A | 4/1993 | Greene | |
| 5,291,205 A | 3/1994 | Greene | |
| 5,497,952 A | 3/1996 | Iding | |
| 5,518,937 A | 5/1996 | Furumura et al. | |
| 5,581,257 A | 12/1996 | Greene et al. | |
| 5,808,587 A | 9/1998 | Shima | |
| 6,072,394 A | 6/2000 | Hasegawa et al. | |
| 6,285,284 B1 | 9/2001 | Soe et al. | |
| 6,479,384 B2 | 11/2002 | Komai et al. | |
| 6,642,827 B1* | 11/2003 | McWilliams et al. | 336/107 |
| 6,966,488 B2 | 11/2005 | Yamagami | |
| 7,061,083 B1 | 6/2006 | Usami et al. | |
| 7,158,033 B2* | 1/2007 | Forster | 340/572.1 |
| 7,227,504 B2 | 6/2007 | Deguchi et al. | |
| 7,288,320 B2 | 10/2007 | Steenblik et al. | |
| 7,317,420 B2 | 1/2008 | Aisenbrey | |
| 7,405,665 B2 | 7/2008 | Yamazaki | |
| 7,427,577 B2 | 9/2008 | Tang et al. | |
| 7,508,305 B2 | 3/2009 | Yamazaki et al. | |
| 7,876,189 B2* | 1/2011 | Gilmartin et al. | 336/192 |
| 7,893,837 B2* | 2/2011 | Yamazaki et al. | 340/572.1 |
| 7,984,849 B2 | 7/2011 | Berghel et al. | |
| 2003/0037240 A1 | 2/2003 | Yamagishi et al. | |
| 2003/0095032 A1 | 5/2003 | Hoshino et al. | |
| 2003/0136828 A1 | 7/2003 | Takesada et al. | |
| 2005/0194591 A1 | 9/2005 | Usami et al. | |
| 2006/0044111 A1 | 3/2006 | Kollar et al. | |
| 2006/0044769 A1* | 3/2006 | Forster et al. | 361/760 |
| 2006/0202269 A1 | 9/2006 | Suzuki et al. | |
| 2007/0138251 A1 | 6/2007 | Mattlin et al. | |
| 2007/0176622 A1 | 8/2007 | Yamazaki | |
| 2007/0210364 A1 | 9/2007 | Kato et al. | |
| 2008/0042168 A1 | 2/2008 | Watanabe et al. | |
| 2008/0130018 A1 | 6/2008 | Steenblik et al. | |
| 2008/0303735 A1 | 12/2008 | Fujimoto et al. | |
| 2010/0026441 A1* | 2/2010 | Wedley | 336/221 |
| 2010/0066619 A1 | 3/2010 | Furumura et al. | |
| 2010/0067166 A1 | 3/2010 | Furumura et al. | |
| 2011/0063184 A1* | 3/2011 | Furumura et al. | 343/856 |

FOREIGN PATENT DOCUMENTS

| | | |
|---|---|---|
| JP | 63-112198 | 5/1988 |
| JP | 63-261851 | 10/1988 |
| JP | 3-087027 | 4/1991 |
| JP | 05-101249 | 4/1993 |
| JP | 06-350495 | 12/1994 |
| JP | 07-263935 | 10/1995 |
| JP | 08-022514 | 1/1996 |
| JP | 08-305970 | 11/1996 |
| JP | 10-069533 | 3/1998 |
| JP | 10-171951 | 6/1998 |
| JP | 11-328493 | 11/1999 |
| JP | 2000-269166 | 9/2000 |
| JP | 2001-230220 | 8/2001 |
| JP | 2002-271122 | 9/2002 |
| JP | 2002-333913 | 11/2002 |
| JP | 2003-058659 | 2/2003 |
| JP | 2003-087044 | 3/2003 |
| JP | 2003-157477 | 5/2003 |
| JP | 2003-187195 | 7/2003 |
| JP | 2003-216908 | 7/2003 |
| JP | 2003-242472 | 8/2003 |
| JP | 2004-079746 | 3/2004 |
| JP | 2004-139405 | 5/2004 |
| JP | 2004-159960 | 6/2004 |
| JP | 2005-020058 | 1/2005 |
| JP | 2005-050997 | 2/2005 |
| JP | 2003-179005 | 4/2005 |
| JP | 2005-183741 | 7/2005 |
| JP | 2005-197630 | 7/2005 |
| JP | 2005-208775 | 8/2005 |
| JP | 2005-216099 | 8/2005 |
| JP | 2005-284333 | 10/2005 |
| JP | 2005-285109 | 10/2005 |
| JP | 2005-340658 | 12/2005 |
| JP | 2005-340791 | 12/2005 |
| JP | 2006-012086 | 1/2006 |
| JP | 2006-027745 | 2/2006 |
| JP | 2006-041986 | 2/2006 |
| JP | 2006-066899 | 3/2006 |
| JP | 2006-180043 | 7/2006 |
| JP | 2006-203852 | 8/2006 |
| JP | 2006-277667 | 10/2006 |
| JP | 2006-285958 | 10/2006 |
| WO | WO 00/36555 | 6/2000 |
| WO | 2008099955 A1 | 8/2008 |

OTHER PUBLICATIONS

The International Preliminary Report on Patentability and Written Opinion issued in PCT/JP2007/072746 mailed on Jun. 11, 2009.
Usami, Mitsuo, "An ultrasmall RFID chip: μ-chip," Oyo Buturi, vol. 73, No. 9, 2004, pp. 1179-1183 (English Abstract only).
International Preliminary Report on Patentability issued Jun. 3, 2009 for PCT/JP2007/072749 (English translation).
International Preliminary Report on Patentability issued Jun. 3, 2009 for PCT/JP2007/072750 (English translation).
International Preliminary Report on Patentability issued Jun. 3, 2009 for PCT/JP2007/072751 (English Translation).
International Preliminary Report on Patentability issued Jun. 3, 2009 for PCT/JP2007/072752 (English translation).
International Preliminary Report on Patentability issued Jul. 9, 2009 for PCT/JP2007/074108 (English translation).
Usami, Mitsuo, et al., Ubiquitous Technology IC Tag, first edition, Ohmsha, Ltd., pp. 115, Mar. 15, 2005.
Non-Final Office Action for U.S. Appl. No. 12/516,500, mailed on Sep. 29, 2011, 15 pp.
Non-Final Office Action for U.S. Appl. No. 12/521,244, mailed on Nov. 8, 2011, 11 pp.
Non Final Office Action mailed Nov. 21, 2011 for U.S. Appl. No. 12/516,497 filed on Oct. 20, 2009, 6 pages.
English Language Translation of International search Report and Writen Opinion mailed on Jan. 29, 2008 for International Application No. PCT/JP2007/072747, 8 pages.
English Language Translation of International Preliminary Report on Patentability mailed on Jun. 11, 2009 for International Application No. PCT/JP2007/072747, 6 pages.
English Language Translation of International Search Report and Written Opinion mailed on Feb. 19, 2008 for International Application No. PCT/JP2007/072748, 7 pages.
English Language Translation of International Preliminary Report on Patentability mailed on Jun. 11, 2009 for International Application No. PCT/JP2007/072748, 7 pages.
"RFID 'Powder'—World's Smallest RFID Tag," Hitachi, Technovelgy LLC, Feb. 14, 2007, http://www.technovelgy.com/ct/Science-Fiction-News.asp?NewsNum=939"", 3 pages.
Junko Yoshida, "Euro bank notes to embed RFID chips by 2005," EETimes News and Analysis, Dec. 19, 2001, http://www.eetimes.com/story/OEG20011219S0016, 3 pages.
Winston Chai, "Euro notes to get RFID tags from Hitachi?," CBS Interactive Limited, May 23, 2003, http://networks.silicon.com/mobile/0.39024665,10004316,00.htm, 8 pages.
Tetsuo Nozawa, "Hitachi Achieves 0.05-mm Square Super Micro RFID Tag. 'Further Size Reductions in Mind'," Tech-On Nikkei Business Publications, Feb. 20. 2007, http://techon.nikkeibp.com.jp/english/NEWS_EN/20070220/127959/, 2 pages.
English Language Translation of International Search Report and Written Opinion mailed on Feb. 19, 2008 for International Application No. PCT/JP2007/072749, 6 pages.
Tim Horriyak, "RFID Powder," Scientific American, Inc., Feb. 2008. pp. 68-71.
N Mura et al.. "RF-Powder : Fabrication of 0.15-mm Si-powder Resonating at Microwave Frequencies,", IEEE European Microwave Conference, 2007, vol. 9, Issue 12, Oct. 2007, pp. 392-395.
English Language Translation of International Search Report and Written Opinion mailed on Feb. 26, 2008 for International Application No. PCT/2007/072750, 9 pages.
English Language Translation of International Search Report and Written Opinion mailed on Feb. 5, 2008 for International Application No. PCT/JP2007/072751, 10 pages.

English Language Translation of International Search Report and Writen Opinion mailed on Feb. 12, 2008 for International Application No. PCT/JP2007/072752, 10 pages.

W Choi et al,, "RFID Tag Antenna with a Meandered Dipole and Inductively Coupled Feed," IEEE Antennas and Propagation Society International Symposium 2006, vol. 9, Issue 14, Jul. 2006, pp. 619-622.

Li Yang et al., "Design and Development of Novel Miniaturized UHF RFID Tags on Ultra-low-cost Paper-based Substrates," Proceedings of Asia-Pacific Microwave Conference 2006, vol. 12, Issue 15, Dec. 2006, pp. 1493-1496.

Non-Final Office Action for U.S. Appl. No. 12/516,643, mailed on Jan. 12, 2012, 13 pp.

Notice of Allowance for U.S. Appl. No. 12/521,244, mailed on Jan. 26, 2012, 9 pp.

Restriction Requirement for U.S. Appl. No. 12/516,705, mailed on Dec. 12, 2011, 7 pp.

Non-final Office Action received for U.S. Appl. No. 12/516,500 dated Feb. 3, 2012.

Hitachi Pamphlet, World's smallest and thinnest 0.15 x 0.15 mm, 7.51-lm thick RFID IC chip, Feb. 6, 2006, http://www.hitachi.com/New/cnews/060206.html, 3 pages.

Non-final Office Action received for U.S. Appl. No. 12/516,705 dated Mar. 19, 2012.

* cited by examiner

US 8,178,415 B2

METHOD FOR MANUFACTURING RF POWDER

CROSS REFERENCE TO RELATED APPLICATIONS

The present application is a U.S. national stage application claiming the benefit of International Application No. PCT/JP2007/072746, filed on Nov. 26, 2007, which claims the benefit of Japanese Application No. 2006-318530, filed on Nov. 27, 2006, the entire contents of which are incorporated herein by reference in their entireties.

TECHNICAL FIELD

The present invention relates to a method for manufacturing RF powder and, in particular, a method for manufacturing RF powder wherein the RF powder in a powder form is contained in paper or the like and information of the RF powder can be read using an external high-frequency electromagnetic field (radio transmission).

BACKGROUND ART

Nowadays, IC tags are considered products opening the ubiquitous era and they have been developed for use as RF-ID (radio frequency identification) in nametags, Suica cards, FeRAM cards, or the like. Many people expect that the market of IC tags will surely grow into a large one. However, the current IC tag market is smaller than expected because of problems requiring social efforts to solve, such as issues regarding price, security, and confidentiality.

Prices of IC tags can be lowered by reducing the sizes of IC tag chips, because the smaller IC tag chips are, the more IC tag chips can be obtained from a wafer. The smallest IC tag chips to date have dimensions of 0.4 millimeters square, and from such IC tag chips, 128-bit memory data can be read using microwaves of 2.45 GHz frequency (e.g., see Non-patent Document 1).

A known method for manufacturing an IC tag chip is described in, for example, the "Related Art" section of Patent Document 1. In this manufacturing method, the backside of a wafer having an IC on the foreside is ground by backgrinding so that the wafer has a reduced thickness, and then the wafer is diced into many IC tag chips each having a predetermined shape. In this dicing step, a dicing saw is used to cut and separate a wafer into many IC tag chips.

Patent Document 1: Japanese Unexamined Patent Application Publication No. 2003-179005

Non-patent Document 1: Mitsuo Usami, *An ultrasmall RFID chip*: μ-*chip*, OYO BUTURI, Vol. 73, No. 9, p. 1179-1183 (2004)

DISCLOSURE OF INVENTION

Problems to be Solved by the Invention

Non-patent Document 1 describes that the IC tag chips disclosed therein are semiconductor devices to be individually handled. However, typical IC tag chips are ultrasmall semiconductor devices having a length of approximately 0.4 mm, and thus are difficult to handle individually in practice. Furthermore, in terms of cost, they are slightly expensive.

Additionally, a known separation method for dividing a wafer into many semiconductor devices to make RF powder is one in which wafers are cut along dicing lines using a dicing saw, and this known separation method has a problem that some areas of wafers, such as a considerable area used for cutting and an area affected by this cutting process, cannot be used to produce IC tag chips. Furthermore, production of smaller IC tag chips would necessitate more dicing lines, and accordingly the number of unusable areas would increase, thereby making efficient use of wafers impossible. This means that the number of IC tag chips obtained from a wafer is reduced.

Meanwhile, the term "RF powder" mentioned above represents powder (a powdery entity or powder particles) that is composed of a large amount of particles individually having an electric circuit component that transmits a signal (information) to an external reader and receives a signal (information) from the reader via radio transmission (a high-frequency electromagnetic field), and usually used as a collective entity.

To solve the problems described above, the present invention provides a method for manufacturing RF powder wherein the RF powder is composed of a large amount of particles and used as collective powder (a powdery entity); the large amount of particles composing the powder are smaller than current IC tag chips and used as devices having functions substantially equivalent to those of the IC tag chips; the RF powder particles are used not as individual devices but as a collective powder for ease in handling; a large amount of RF powder particles can be obtained from a wafer in a stable manner and at a high yield; and the low price per particle significantly reduces manufacturing cost and ensures very high practical utility.

Means for Solving the Problems

To accomplish the objective described above, the method for manufacturing RF powder according to the present invention is configured as follows.

The method for manufacturing RF powder according to the first aspect is a method for manufacturing RF powder composed of a large amount of particles each having a substrate and a magnetic coupling circuit device formed on an insulating film covering the substrate, and this method includes a step of forming a plurality of magnetic coupling circuit devices on a wafer; a gas dicing step for drawing dicing grooves on a wafer surface on which the magnetic coupling circuit devices are formed to locate positions of separation of the magnetic coupling circuit devices; a protection film formation step for coating surrounding areas of antenna circuit devices with a protection film; a reinforcement step for attaching the wafer foreside on which the protection film is formed to a supporting plate using an adhesive sheet; a grinding step for grinding the backside of the wafer until the dicing grooves are reached; and a separation step for separating the magnetic coupling circuit devices by removing the adhesive sheet and the supporting plate.

The method for manufacturing RF powder according to the second aspect is a method for manufacturing RF powder composed of a large amount of particles each having a substrate and a magnetic coupling circuit device formed on an insulating film covering the substrate, and this method includes a step of forming a plurality of magnetic coupling circuit devices on a wafer; a gas dicing step for drawing dicing grooves on a wafer surface on which the magnetic coupling circuit devices are formed to locate positions of separation of the magnetic coupling circuit devices; a protection film formation step for coating surrounding areas of the magnetic coupling circuit devices with a protection film; a reinforcement step for attaching the wafer foreside on which the protection film is formed to a supporting plate; a grinding step for grinding the backside of the wafer until the wafer has a predetermined thickness; an etching step for etching the backside of the wafer until the dicing grooves are reached; and a separation step for separating the magnetic coupling circuit devices by removing the supporting plate.

In this second manufacturing method, the reinforcement step is a step of attaching the foreside of the wafer to the supporting plate using an adhesive agent or an adhesive sheet. In the etching step, wet etching or dry etching is performed.

The method for manufacturing RF powder according to the third aspect is a method for manufacturing RF powder composed of a large amount of particles each having a substrate and a magnetic coupling circuit device formed on an insulating film covering the substrate, and this method includes a step of forming a plurality of magnetic coupling circuit devices on a wafer; a protection film formation step for coating the wafer foreside on which the magnetic coupling circuit devices are formed with a protection film; a reinforcement step for attaching the wafer foreside coated with the protection film to a supporting plate; a grinding step for grinding the backside of the wafer until the wafer has a predetermined thickness; a removal step for removing the supporting plate; a step of irradiating the wafer with a laser in such a manner that the laser traces lines for separation of the magnetic coupling circuit devices; and a separation step for separating the magnetic coupling circuit devices.

In this third manufacturing method, the laser irradiation step involves the use of light that can enter the wafer as a laser. This light exerts a nonlinear absorption effect in the wafer, thereby forming an affected layer. This affected layer enables easy separation of the magnetic coupling circuit devices.

The methods for manufacturing RF powder described above preferably further include a step of coating a large amount of RF powder composed of the separated antenna circuit devices after the separation step.

The methods for manufacturing RF powder described above may further include a step of plating metal portions having the magnetic coupling circuit devices formed on an insulating layer after the formation of many magnetic coupling circuit devices on the substrate. The metal portions consist of Cu (copper), and the plating may be performed using electroless deposition of CoWP.

In the methods for manufacturing RF powder described above, the protection film may be a bilayer film. In addition, such a bilayer film preferably consists of a silicon oxide film and a silicon nitride film. Polyimide can also be used as a component of the protection film.

Advantages

The present invention described above has the following advantageous effects.

First, the manufacturing cost can be reduced because many chips can be obtained from a wafer.

Second, the yield is high because an adhesive sheet is used to attach a wafer to a supporting plate and thus the powder can be easily produced just by grinding the wafer backside to remove the RF powder particles from the plate.

Third, the number of RF powder particles obtained from a wafer is greater than that of RF powder particles obtained by dicing a wafer using a cutting tool because the width of each dicing groove, along which RF powder particles are separated, is smaller thanks to the gas dicing step.

Fourth, the width of each dicing groove can be further reduced because separation of RF powder particles is achieved by the formation of an affected layer using a laser and this eliminates the need for dicing grooves. In addition, the number of RF powder particles obtained from a wafer is increased and accordingly the manufacturing cost is reduced.

Fifth, the magnetic coupling circuit devices built into RF powder particles are more securely protected because the RF powder particles are coated or the magnetic coupling circuit devices are plated.

Best Mode for Carrying Out the Invention

Hereinafter, preferred embodiments of the present invention (examples) are described with reference to the attached drawings.

Examples of the RF powder are described with reference to FIGS. 1 to 8. FIG. 1 shows the mode of use, storage, and management of the RF powder. In FIG. 1, RF powder 11 is stored in a container 1 like a bottle. The RF powder 11 is in the mode of use as powder (a powdery entity or powder particles). In addition, a colorless or colored liquid media may be put into the bottle together with the RF powder 11 for storage and management.

FIG. 2 is an enlarged diagram showing a plurality of particles 11a of the RF powder 11 taken out of the container 1 and placed on a sheet member 2, such as a rectangle piece of paper. In FIG. 2, the size of each particle 11a composing the RF powder 11 is shown as magnified. Each particle 11a has a cubic or rectangular solid shape. It should be noted that the thickness of the sheet member 2 is shown without magnification. Hereinafter, the "particle 11a" is referred to as an "RF powder particle 11a."

Next, an RF powder particle (11a) as a component of the RF powder is described with reference to FIGS. 3 to 6. In the following explanation, such an RF powder particle 11a is referred to as an RF powder particle 21.

FIG. 3 is an oblique view of the appearance of an RF powder particle, FIG. 4 is a plan view of the RF powder particle, FIG. 5 is a cross-sectional view showing the cross-section along the A-A line in FIG. 4, and FIG. 6 is a cross-sectional view showing the cross-section along the B-B line in FIG. 4. In these vertical cross-sectional views, FIGS. 5 and 6, the thickness of the RF powder particle is shown as magnified.

The RF powder particle 21 preferably has a three-dimensional shape like a cube or a similar plate-like rectangular solid. On the rectangular planes composing the outer surface of the particle, the dimensions of ones including the longest edges are preferably 0.30 millimeters square or smaller, and more preferably 0.15 millimeters square or smaller. The RF powder particle 21 in this embodiment is, as shown in FIG. 4, formed so that the planes thereof have a square shape. The length of each edge L of these square planes of the RF powder particle 21 shown in FIG. 4 is, for example, 0.15 mm (150 µm).

On the RF powder particle 21, an insulating layer 23 (e.g., $SiO_2$) is formed on a substrate 22, such as silicon (Si). On the insulating layer 23, a coil 24 (an inductance component) and a condenser (or a capacitor) 25 (a capacitance component) are formed using a film-forming technique. The thickness of the insulating layer 23 is, for example, approximately 10 µm. The condenser 25 consists of two components 25a and 25b.

A circuit device formed by connection of the coil 24 and the condenser 25 formed on the insulating layer 23 has a function of allowing a resonance current to flow in itself when coupled with a high-frequency magnetic field having a particularly designed specific frequency (e.g., 2.45 GHz) (hereinafter, this function is referred to as "sensing"). As shown in FIG. 3 or 4, the coil 24 is formed by coiling a conductive wire to make, for example, three turns along the edges of a square plane of the RF powder particle 21. An example of the material of a conductive wire forming the coil 24 is copper (Cu).

Both ends of the coil 24 are square pads 24a and 24b having a desired area. These two pads 24a and 24b are positioned at an inner position and an outer position such that a part of the coil 24 is positioned so as to cross therebetween. The line between the two pads 24a and 24b is perpendicular to the crossing part of the coil 24. The pad 24a acts as an upper electrode of the component 25a of the condenser 25, whereas the pad 24b acts as an upper electrode of the component 25b of the condenser 25.

In the configuration described above, the number of turns, length, and shape of the coil 24 may be designed so as to sense a desired specific frequency.

The condenser 25 in this embodiment consists of, for example, two condenser components 25a and 25b. The condenser component 25a has an upper electrode 24a and a lower electrode 26a (e.g., aluminum (Al)) and an insulating film 27 (e.g., $SiO_2$) inserted therebetween. The upper electrode 24a and the lower electrode 26a have similar electrode shapes, and are electrically isolated by the insulating film 27. On the other hand, the condenser component 25b has an upper electrode 24b and a lower electrode 26b and the insulating film 27 inserted therebetween. As with their counterparts, the upper electrode 24b and the lower electrode 26b have similar electrode shapes and are electrically isolated by the insulating film 27.

The lower electrode 26a of the condenser component 25a and the lower electrode 26b of the condenser component 25b are connected to each other through a conductive wire 26c. In practice, the two lower electrodes 26a and 26b and the conductive wire 26c are formed as an integrated unit. Meanwhile, the insulating film 27 is a monolayer insulating film common to both condenser components 25a and 25b, and has a thickness of, for example, 30 nm. The insulating film 27 electrically insulates the conductive wire 26c connecting the lower electrodes 26a and 26b to each other and the coil 24 in the region between the two condenser components 25a and 25b.

In the configuration described above, both ends of the coil 24 are connected to the condenser 25 consisting of the two condenser components 25a and 25b electrically connected in series. The coil 24 and the condenser 25, which are connected so as to each other as to make a loop, form a tank circuit (an LC resonance circuit). This tank circuit senses a high-frequency magnetic field having a frequency that is equal to its resonance frequency.

In addition, as is clear from FIGS. 5 and 6, all planes of the RF powder particle 21 are coated with a P-SiN film 28. The P-SiN film 28 protects the entire area of the surface of the RF powder particle 21 on which the tank circuit is formed.

In the configuration described above, the condenser 25 consists of the two condenser components 25a and 25b. However, it may consist of any one of the condenser components. The capacitance of the condenser 25 may be appropriately designed by changing the areas of the electrodes. In addition, a plurality of condensers may be used and arranged in parallel.

An RF powder particle 21 having the structure described above has a tank circuit consisting of a multi-turn coil 24 and a condenser 25 connected to each other on an insulating surface of a substrate 22 so as to make a loop, and thus has a function of sensing a high-frequency magnetic field determined by the resonance frequency of the tank circuit. In this way, the RF powder particle 21 acts as a "powdery magnetic coupling circuit device," which resonates when coupled with a magnetic field having a designed specific frequency.

In addition, the coil 24 and the condenser 25 formed on the insulating layer 23 have no electric connection with the surface of the substrate 22. Therefore, the insulating layer 23 deposited on the substrate 22 has no contact hole and no contact wiring. This means that the tank circuit consisting of the coil 24 and the condenser 25 is electrically isolated from the silicon substrate 22 and it acts as a resonance circuit alone and independently of the substrate 22.

In the RF powder particle 21 described above, the substrate 22 used as a base is a silicon substrate and has a surface coated with the insulating film 23. However, the substrate may be made of other dielectric substances (insulating substances), such as glass, resin, and plastic, instead of a silicon substrate. Substrates made of glass or any other insulating material would not require the special insulating film 23 because the material is an inherently insulating substance (dielectric substance).

Next, an example of practical use of the RF powder 11 is described with reference to FIGS. 7 and 8.

A considerable number of RF powder particles 11a of RF powder 11 are contained in a sheet member 30 as a base, such as a piece of paper. In FIG. 7, the thickness of the sheet member 30 is shown as magnified. If the sheet member 30 is a banknote or the like, for example, RF powder particles 11a are put into a solution containing an adhesive binding agent (e.g., ink or paint) and then the solution is applied to the sheet member 30 so that the RF powder particles 11a are fixed and attached thereto. In this process, each RF powder particle 11a is not inspected. In other words, no particular test is performed to check whether each RF powder particle 11a is normal or abnormal. FIG. 7 shows a plurality of RF powder particles 11a arranged in a sheet member 30. It should be noted that addition of RF powder particles 11a to a base, such as a piece of paper, may be involved in the manufacturing process of the base.

The sheet member 30 containing a plurality of RF powder particles 11a is scanned with a reader 32 connected to a computer 31 to read frequency response information of the RF powder particles 11a. The computer 31 has a display unit 31a, a main unit 31b that processes the frequency information (data), a keyboard 31c, and other components.

The reader 32 has a scanning probe 33 (see FIG. 8). This scanning probe 33 generates a high-frequency electromagnetic field therearound and is coupled with powder particles (RF powder particles 11a in FIG. 7) by magnetic coupling. For example, if the specific frequency of a powder particle is 2.45 GHz, the RF powder particle would resonate with a high-frequency electromagnetic field having the same frequency, 2.45 GHz, and then the energy of the electromagnetic field is transmitted to the RF powder particle. For efficient transmission of this energy, it is necessary that the electromagnetic field generated by the scanning probe 33 and the coil of each RF powder particle are close enough to be coupled with each other well. For efficient coupling of the two bodies in space, it is desirable that the coils of the bodies have almost the same size and the distance between them is almost equal to the size of the coils. Resonance can be confirmed by, for example, measuring reflectance because this parameter decreases in case of energy loss, more specifically, when energy transmitted to a circuit is not returned. To detect the specific vibration frequency of the RF powder particle, 2.45 GHz, a frequency generated by the scanning probe is changed within the range of, for example, 1 to 3 GHz. The reader 32 scans the surface of the sheet member 30 as a base to locate the powder particles while a certain distance from the surface is kept constant so that magnetic coupling consistently occurs.

FIG. 8 illustrates an RF powder particle 11a receiving and reflecting energy by magnetic coupling. The reader 32 is in a scanning operation and the scanning probe 33 is located above the RF powder particle 11a. The scanning probe 33 generates a high-frequency magnetic field having a frequency varying within a predetermined range therearound. When the frequency of the magnetic field gets close to or reaches the specific vibration frequency of the RF powder particle 11a, magnetic coupling occurs and an oscillating current having the same frequency flows in the tank circuit, consisting of a coil and a condenser, of the RF powder particle 11a, thereby resulting in transmission of energy (the arrow 34 in FIG. 8). This current generates a magnetic field therearound and consumes a part of the transmitted (or "received") energy to produce heat in the circuit. This consumed energy is an energy loss, which can be measured as a decrease in reflection (the arrow 35 in FIG. 8) using the scanning probe 33. The maximum energy loss, or the greatest decrease in reflection, is observed when the specific vibration frequency is reached. The reader 32 detects the frequency at which resonance occurs during this measurement as the frequency data information of the RF powder particle 11a, and sends it, together with the positional information of the scanning probe 33, to the computer 31. The data of the RF powder particle 11a (data of its position and resonance frequency) is stored in a memory of the computer 31.

The reader 32 scans the entire surface of the sheet member 30 shown in FIG. 7. Thus, frequency information of the RF powder 11 (a large amount of RF powder particles 11a) dispersed in the entire scanned area is read and stored in a memory of the computer 31. Such information stored in a memory of the computer 31 is processed if it is necessary and then displayed in the display unit 31a.

In addition, the shape and structure of the scanning probe 33, the principle of data communication, and other conditions described above may be altered or redesigned as needed. For example, a network analyzer can be used. When resonance occurs, the amplitude of the reflection response is attenuated. A network analyzer analyzes this attenuation to detect RF powder particles and determine the resonance frequency.

The method described above enables adding the RF powder 11 to banknotes, important document such as official documents, driver's licenses, health insurance cards, and other important cards, and enables the use of RF powder 11 in detection of forged banknotes, certification of important documents, and other applications. In such applications, a large amount of RF powder particles 11a are collectively used instead of a single IC tag chip, and thus handling is easy.

Next, the first embodiment of the method for manufacturing RF powder according to the present invention is described with reference to FIGS. 9 and 10.

FIG. 9 shows all steps of manufacturing of RF powder 11, and FIG. 10 shows vertical cross-sectional views of a wafer (a substrate) or RF powder particles 11a corresponding to the individual manufacturing steps.

The method for manufacturing RF powder 11 includes a device formation step (Step S11), a resist pattern formation step (Step S12), a gas dicing step (Step S13), a protection film formation step (Step S14), a ceramic plate attaching step (Step S15), a grinding step (Step S16), and a separation step (Step S17).

These steps S11 to S17 are briefly described below. The device formation step S11 is a step for forming many magnetic coupling circuit devices on a wafer (or a substrate). The resist pattern formation step S12 is a step for forming a resist pattern on the wafer foreside, i.e., the surface on which many magnetic coupling circuit devices are formed. The gas dicing step S13 is a step for forming dicing grooves by plasma etching. The protection film formation step S14 is a step for forming a protection film for each magnetic coupling circuit device. The ceramic attaching step S15 is a step for attaching the wafer foreside to a supporting plate such as a ceramic plate using an adhesive sheet. The grinding step S16 is a step for grinding the backside of the wafer until the bottoms of the dicing grooves are reached. The separation step S17 is a step for separating antenna circuit devices, i.e., RF powder particles 11a, from the adhesive sheet to produce a large amount of RF powder particles 11a. Hereinafter, these steps are described in detail.

In the above-mentioned device formation step S11, an insulating film (e.g., an oxide film) having a thickness of approximately 10 μm is formed on a surface of a wafer, and then tank circuits (magnetic coupling circuit devices) each consisting of an inductor and a capacitor are formed on the insulating film. In FIG. 10, the numerals 39 represent magnetic coupling circuit devices. An exposure method used to form magnetic coupling circuit devices on an insulating substance deposited on a surface of a wafer and having a thickness of 10 μm is typically an exposure method using parallel rays of light and preferably an exposure method using X-ray. An insulating film having a thickness of 10 μm would have concaves and convexes on its surface, and a usual reduced projection exposure method having a depth of focus cannot transfer such a film accurately. However, an exposure method using parallel rays of light (X-ray) makes it possible to transfer a mask pattern to a resist accurately, thereby enabling forming magnetic coupling devices accurately. Coils used as magnetic coupling devices are made of a copper material (by copper plating).

In addition, a step of plating metal portions of the magnetic coupling circuit devices to be used as RF powder particles 11a with a different kind of metal may be added after the step of forming a large amount of such circuit devices on a wafer substrate. In particular, metal portions consisting of Cu would preferably be plated using electroless deposition of CoWP. This plating protects the metal portions, such as Cu, and prevents them from being corroded.

Meanwhile, the number of many magnetic coupling circuit devices 39 formed on a wafer depends on the width of dicing grooves. However, for example, it is one million to three millions when a 300-mm wafer is used.

Next, the pattern formation step S12 is conducted to form a mask pattern on resist (FIG. 10 (a)). In FIG. 10 (a), magnetic coupling circuit devices are formed on an insulating film coating a surface of a wafer (a substrate) 40. On the wafer 40, on which many magnetic coupling circuit devices are formed in the device formation step S11, resist mask patterns 42 partitioned by dicing lines 41 having a width less than 50 μm or preferably in the order of 10 to 30 μm are formed through a lithographic process. In FIG. 10 (a), the resist mask patterns 42 respectively correspond to the magnetic coupling circuit devices 39 described above. It should be noted that FIG. 10 (a) illustrates only a relationship between the upper and lower components and does not represent the structure thereof.

FIG. 10 (b) shows the state of the wafer 40 obtained after the gas dicing step S13. In the gas dicing step S13, dicing lines 41 designed in accordance with the resist mask patterns 42 are deep-etched until they have a depth in the range of 10 to 100 μm by plasma etching. The obtained grooves 40a are referred to as "dicing grooves." As shown in FIG. 10 (b), in this gas dicing step S13, many dicing grooves 40a used to separate the circuit devices 39 are formed so as to have a grid-like structure.

In the subsequent protection film formation step S14, the resist mask patterns 42 are removed from the foreside of the wafer 40 and then this wafer foreside is coated with a protection film 43, such as a silicon nitride (SiN) film, having a desired thickness by plasma CVD or any other technique (FIG. 10 (c)). The protection film 43 also covers the inner surfaces of the dicing grooves 40a. It should be noted that a step of removing the resist patterns 42 that comes before this protection film formation step S14 is omitted in FIG. 10.

The number of layers constituting the protection film 43 mentioned above may be one or two. For example, a bilayer film consisting of a silicon oxide film and a silicon nitride film may be used. A protection film consisting of two layers would have improved performance in protecting circuit devices and preventing them from being corroded. Polyimide or the like may be used instead of a silicon nitride film to form the protection film 43.

In the subsequent ceramic plate attaching step S15, a double-sided adhesive sheet 44 or any other adhesive means is attached to the wafer foreside (FIG. 10 (d)) and then the wafer 40 is attached to a ceramic plate 45 having desired strength (FIG. 10 (e)).

In the subsequent grinding step S16, the backside 46 of the wafer 40 is ground. In this grinding step S16, the backside 46 of the wafer 40 is ground until the bottoms 47 of the dicing grooves 40a formed on the foreside are reached (FIG. 10 (f)). In this backside grinding, mechanical grinding is usually used. All what has to be done in this grinding step is mechanical grinding. During this process, the wafer 40 and the ceramic plate 45 are firmly attached to each other via the adhesive sheet 44.

In the separation step S17, the ceramic plate 45 is removed and, at the same time, portions of the wafer 40 on which the antenna circuit devices 39 are formed are separated into the RF powder particles 11a described earlier (FIG. 10 (g)). In this way, a large amount of RF powder particles 11a are obtained from a wafer 40.

Using the above-described method, the RF powder 11 described with reference to FIGS. 1 to 8 can be produced. In this manufacturing method, a gas dicing step is used to form dicing grooves, and thus the width of dicing grooves and the areas of portions to be cut can be reduced. This means that an increased number of semiconductor devices are obtained from a wafer. In addition, although a mask pattern formation method using resist was described as an example in this embodiment, a mask pattern formation method using photosensitive polyimide or the like has a similar advantageous effect.

Next, the second embodiment of the method for manufacturing RF powder is described with reference to FIGS. 11 and 12.

FIG. 11 shows all steps of manufacturing of RF powder 11, and FIG. 12 shows vertical cross-sectional views of a wafer or RF powder particles 11a corresponding to the individual manufacturing steps. FIGS. 11 and 12 correspond to FIGS. 9 and 10 described above, respectively. In FIG. 12, components already shown in FIG. 10 are represented by the numerals used in that drawing.

The method for manufacturing RF powder according to the second embodiment includes a device formation step (Step S21), a resist pattern formation step (Step S22), a gas dicing step (Step S23), a protection film formation step (Step S24), a ceramic plate attaching step (Step S25), a grinding step (Step S26), an etching step (Step S27), and a separation step (Step S28).

These steps S21 to S28 are briefly described below. The device formation step S21 is a step for forming many magnetic coupling circuit devices (39) on a wafer. The resist pattern formation step S22 is a step for forming resist patterns on the wafer foreside, i.e., the surface on which many antenna circuit devices are formed. The gas dicing step S23 is a step for forming dicing grooves using a gas. The protection film formation step S24 is a step for forming a protection film for each magnetic coupling circuit device. The ceramic attaching step S25 is a step for attaching the wafer foreside to a supporting plate such as a ceramic plate using an adhesive sheet (adhesive tape), paraffin, or any other adhesive material. The grinding step S26 is a step of grinding the wafer backside and stopping grinding before the bottoms of the dicing grooves are reached. The etching step S27 is a step of removing the wafer backside by etching until the bottoms of the dicing grooves are reached. The separation step S28 is a step for separating the magnetic coupling circuit devices, i.e., RF powder particles 11a, from the adhesive tape to produce a large amount of RF powder particles 11a.

In the method for manufacturing RF powder particles according to the second embodiment, the steps S21, S22, S23, S24, and S28 correspond to the steps S11, S12, S13, S14, and S18 described in FIG. 9, respectively, and involve the same procedures as those steps. Furthermore, FIG. 12 (a), (b), (c), (d), and (h) correspond to FIG. 10 (a), (b), (c), (d), and (e), and represent the same members and their state as those drawings. Therefore, the steps S21, S22, S23, S24, and S28 in FIG. 11 and FIG. 12 (a), (b), (c), (d), and (h) are not further explained. Only the steps specific to the manufacturing method according to the second embodiment are described below.

In the ceramic plate attaching step S25 mentioned above, for example, an adhesive sheet or an adhesive agent 44 is attached or applied to the wafer foreside (FIG. 12 (d)) and then the wafer 40 is attached to a ceramic plate 45 having desired strength (FIG. 12 (e)). In the ceramic plate attaching step of this embodiment, paraffin or an adhesive/fixation material that is soluble in an organic solvent may be used instead of an adhesive sheet to attach a wafer to a ceramic plate.

In the subsequent grinding step S26, the backside 46 of the wafer 40 is ground. In this grinding step S16, the backside 46 of the wafer 40 is ground until the wafer has a predetermined thickness (FIG. 12 (f)). It should be noted that the bottoms 47 of the dicing grooves 40a formed on the foreside should not be reached in this step. More specifically, it is preferable that 50% or more of the total thickness of the wafer is ground.

In the etching step S27, silicon remaining on the backside of the wafer 40 is etched by plasma etching or any other technique, with $SF_6$ or the like being used as a reaction gas, until the bottoms of the dicing grooves are reached (FIG. 12 (g)). This enables separating the devices in a stable manner without breakage of the wafer due to heat or mechanical stress that would be generated by grinding. In addition, the reaction gas does not always have to be $SF_6$, and any other gas having an effect of etching silicon may be used instead. Furthermore, any dry etching method other than plasma etching, such as reactive ion etching, may be used. Wet etching using KOH solution or any other solution having an effect of etching silicon may also be used instead of dry etching. In the case where the wafer is a glass substrate, HF solution is used as an etching solution.

Using the above-described method, the RF powder 11 described with reference to FIGS. 1 to 8 can be produced. In this manufacturing method, mechanical grinding is stopped before dicing grooves are reached, and then the remaining thickness of a wafer is removed by etching, and thus no mechanically damaged layer remains in the resulting RF powder.

Next, the third embodiment of the method for manufacturing RF powder is described with reference to FIGS. 13 and 14.

FIG. 13 shows all steps of manufacturing of RF powder particles 11a, and FIG. 14 shows vertical cross-sectional views of a wafer or RF powder particles 11a corresponding to the individual manufacturing steps. FIGS. 13 and 14 correspond to FIGS. 9 and 10 described above, respectively. In FIG. 12, components already shown in FIG. 10 or the like are represented by the numerals used in those drawings.

The method for manufacturing RF powder according to the third embodiment includes a device formation step (Step S31), a protection film formation step (Step S32), a grinding step (Step S33), a laser irradiation step (Step S34), a separation step (Step S35), and a coating step (S36).

These steps S31 to S36 are briefly described below. The device formation step S31 is a step for forming many magnetic coupling circuit devices (39). The protection film formation step S32 is a step for forming a protection film for each magnetic coupling circuit device. The grinding step S33 is a step for grinding the backside of the wafer 40 until the wafer has a predetermined thickness (e.g., 50 to 10 μm). The laser irradiation step S34 is a step of irradiating the wafer with a laser that can enter silicon in such a manner that the laser traces the dicing lines to form an affected layer. The separation step S35 is a step for separating the magnetic coupling circuit devices, i.e., RF powder particles 11a, from the affected silicon layer by stretching an expansive sheet attached to the wafer 40 to apply tensile stress to the wafer, thereby producing a large amount of RF powder particles 11a. The coating step (S36) is a step of coating the separated RF powder particles with insulating films by CVD or any other technique, if it is necessary.

In this method, the device formation step S31, the protection film formation step S32, and the grinding step S33 correspond to the device formation step S11, the protection film formation step S14, and the grinding step S16 (or S26) described earlier, respectively, and involve the same procedures as those steps. Therefore, the following explanations of the steps S31, S32, and S33 in FIG. 13 and FIG. 14 (a), (b), (c), and (d) deal only with important points thereof. Technical information and steps specific to the manufacturing method according to the third embodiment are also described below as the main subject.

In the protection film formation step S32, the foreside of the wafer 40 is coated with a protection film 60, such as a silicon nitride (SiN) film, having a desired thickness by plasma CVD or any other technique (FIG. 14 (b)).

Before grinding of the backside, a backside-grinding protection sheet 71 is attached to the wafer 40 (FIG. 14 (c)).

In the grinding step S33, the backside 46 of the wafer 40 is ground. In this grinding step S33, the backside 46 of the wafer 40 is ground until the wafer has a predetermined thickness (e.g., 50 to 10 μm; shown in FIG. 14 (d)).

In this backside grinding, mechanical grinding is usually used. All what has to be done in this grinding step is mechanical grinding. Any other techniques including etching and chemical mechanical grinding may be used instead and, of course, these grinding techniques may be used in combination.

In the subsequent laser irradiation step S34, the wafer is irradiated with a laser that can enter silicon in such a manner that the laser traces the dicing lines, and the laser exerts a nonlinear absorption effect in silicon, thereby forming an affected layer 61 (FIG. 14 (d)).

In the separation step S35, an expansive sheet 72 is attached to the wafer (FIG. 14 (e)), and then the expansive sheet 72 is stretched in the directions of the arrows F1 so that tensile stress is applied to the wafer 40. This makes separation occur on the affected silicon layer 61 and thus the magnetic coupling circuit devices, i.e., RF powder particles 11a, are separated into a large amount of individual RF powder particles 11a. These separated RF powder particles 11a individually have a magnetic coupling circuit device 39 (FIG. 14 (f)).

In the coating step (S36), a large amount of the separated RF powder particles 11a are each coated with an insulating film 62 being a silicon oxide film, a silicon nitride film, a bilayer film composed of these two films, or any other insulating film by CVD or any other technique, if it is necessary for the indented application thereof (FIG. 14 (g)). In this way, each magnetic coupling circuit device 39 is protected with the protection film 60 and the insulating film 62.

Using the above-described method, the RF powder 11 described with reference to FIGS. 1 to 8 can be produced. In this manufacturing method, laser irradiation is used to dice a wafer, and thus no dicing groove is needed. Eliminating the need for dicing grooves leads to increase in the number of RF powder particles obtained from a wafer.

In this embodiment, silicon is used as a wafer in manufacturing of RF powder. However, a dielectric substrate, such as a glass substrate, may also be used as a wafer. Substrates like a glass substrate would allow for the use of hydrofluoric acid (HF) in the water etching step.

The configurations, shapes, sizes and positional relationships described in these embodiments are just outlines facilitating understanding and implementation of the present invention, and the numeric values and the compositions (materials) of the individual components are just examples. Therefore, the present invention is not limited to the embodiments described above and many modifications and variations can be made to the present invention without departing from the scope of the technical idea defined by the claims.

INDUSTRIAL APPLICABILITY

The method for manufacturing RF powder according to the present invention provides a method for manufacturing a powder element used as an information storage medium for detection of forged banknotes or the like, certification of documents, or other applications.

Figure 1:
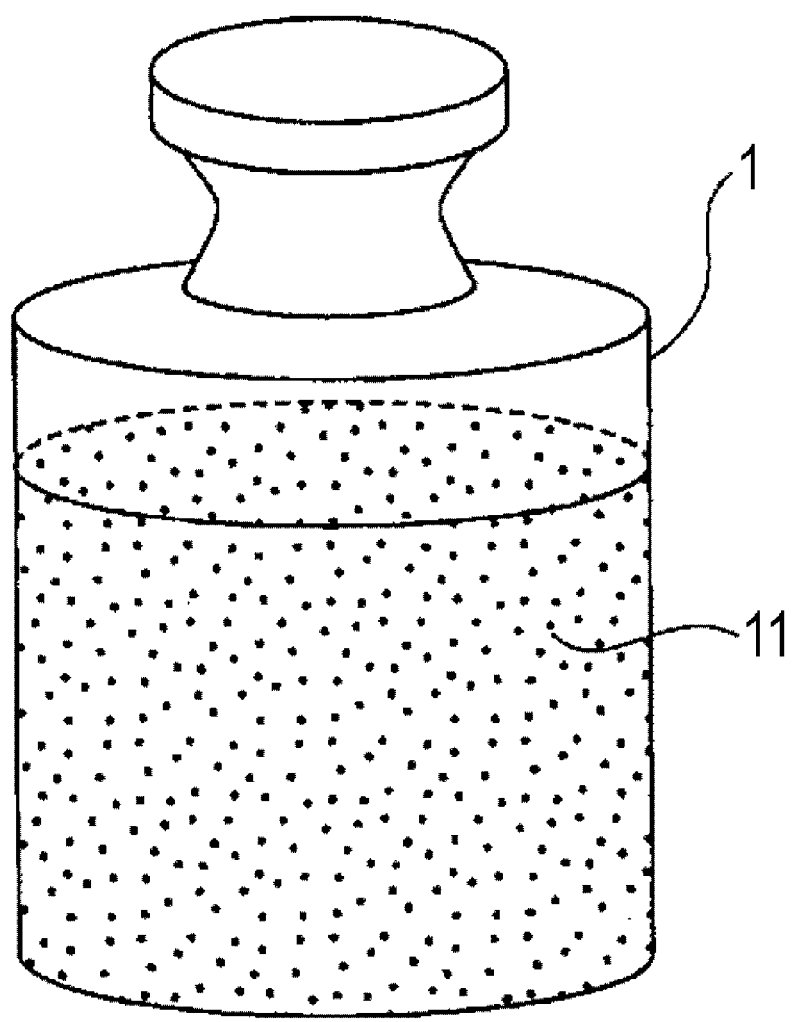
FIG. 1 is a diagram showing the mode of use and management of RF powder.
Reference Numerals
Figure 2:
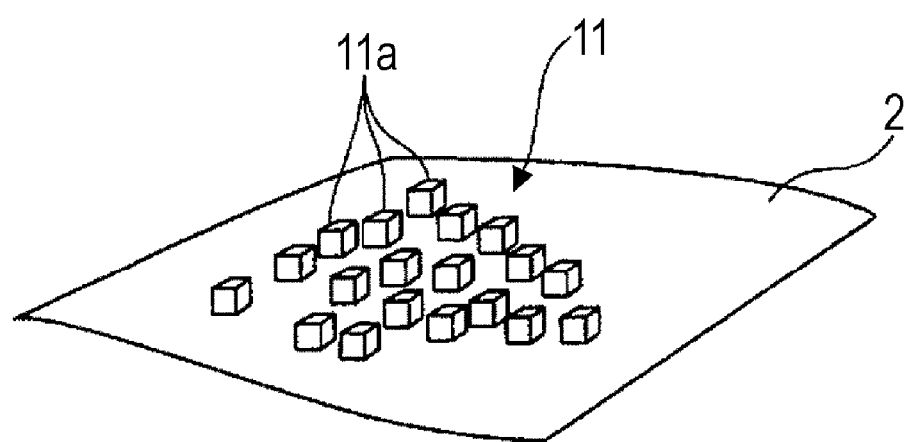
FIG. 2 is an enlarged diagram showing some RF particles taken out of the RF powder.
Figure 3:
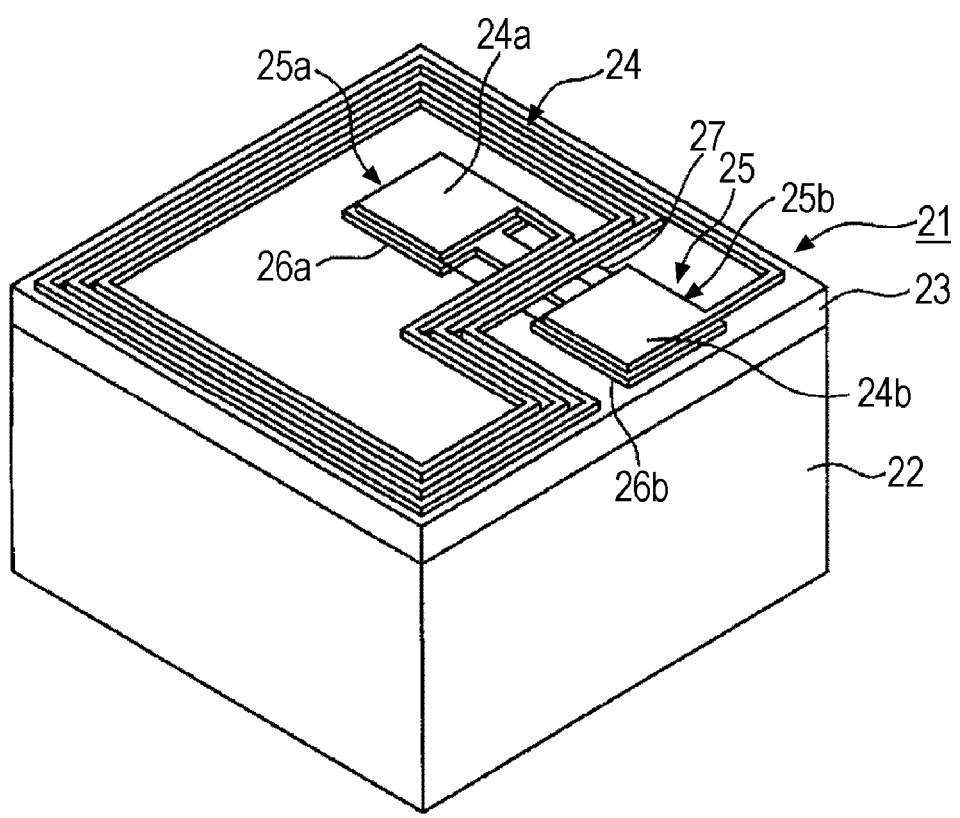
FIG. 3 is an oblique view of an RF powder particle contained in an RF-powder-containing base.
Figure 4:
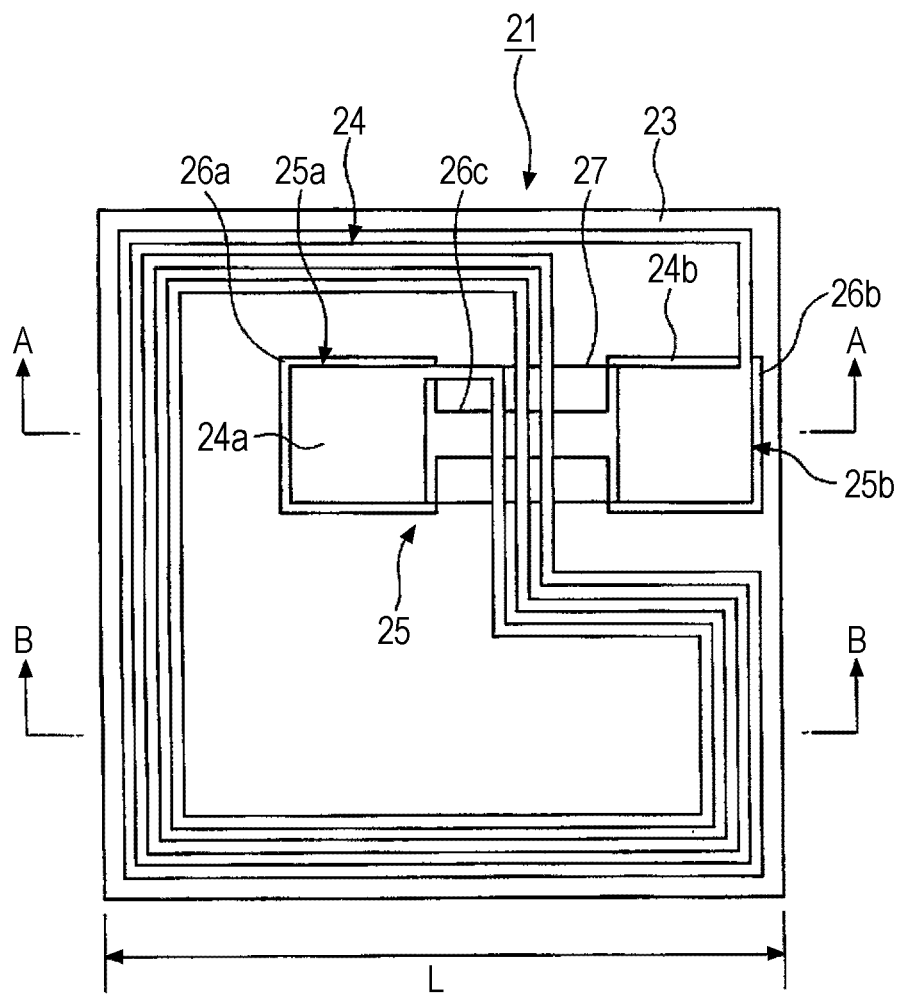
FIG. 4 is a plan view of the RF powder particle.
Figure 5:
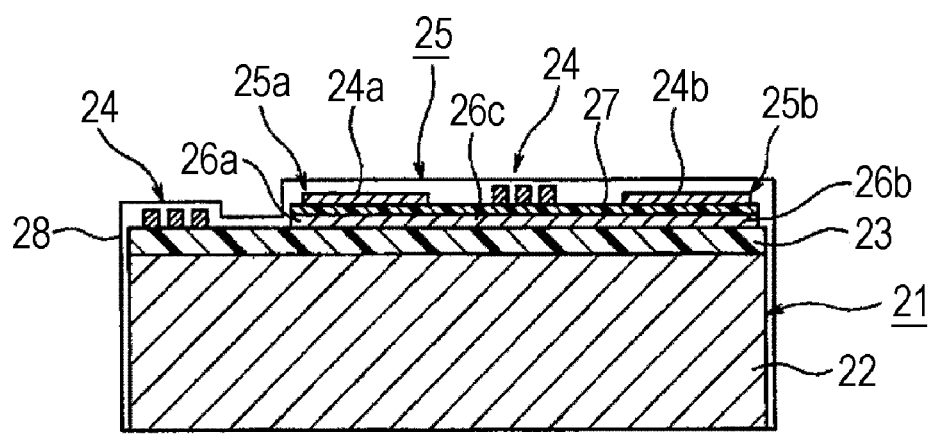
FIG. 5 is a cross-sectional view showing the cross-section along the A-A line in FIG. 4.
Figure 6:
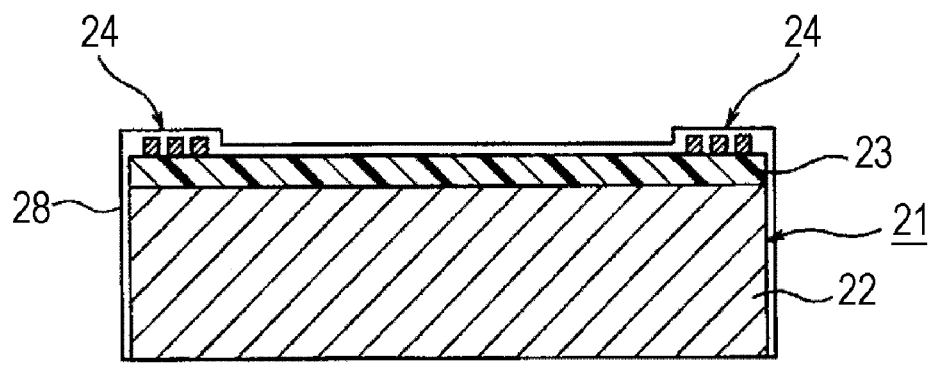
FIG. 6 is a cross-sectional view showing the cross-section along the B-B line in FIG. 4.
Figure 7:
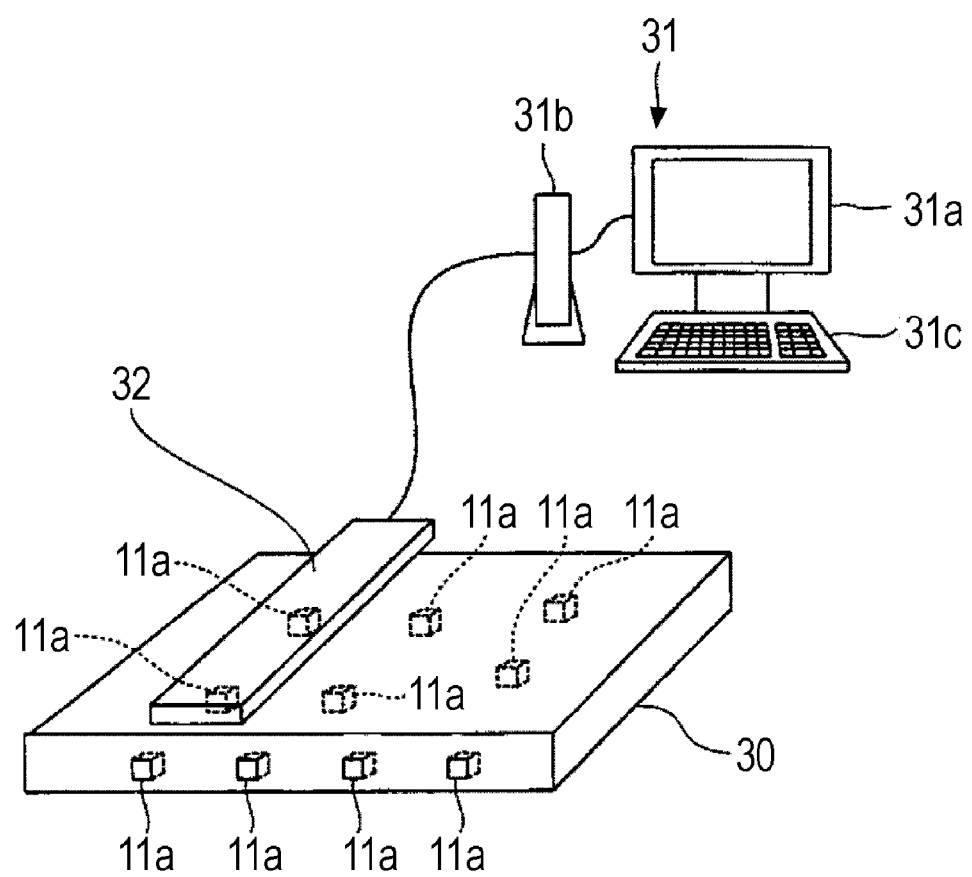
FIG. 7 is a device configuration diagram illustrating an example of practical use of RF powder.

REFERENCE NUMERALS 1 container
11 RF powder
11a RF powder particle
30 sheet member
32 reader
39 magnetic coupling circuit device
40 wafer (substrate)
40a dicing groove
43 protection film
45 ceramic plate
46 backside
60 protection film (e.g., P-SiN)
61 affected Si layer
62 insulating film
71 backside-grinding protection sheet
72 expansive sheet

The invention claimed is:

1. A method for manufacturing RF powder composed of a large amount of particles each having a substrate and a magnetic coupling circuit device formed on an insulating film covering the substrate, comprising:
   forming a plurality of the magnetic coupling circuit devices on a wafer;
   drawing a dicing groove on a wafer surface on which the magnetic coupling circuit devices are formed to locate a position of separation of the magnetic coupling circuit devices;
   coating a surrounding area of the magnetic coupling circuit devices with a protection film;
   attaching a wafer foreside on which the protection film is formed to a supporting plate using an adhesive sheet;
   grinding a backside of the wafer until the dicing groove is reached; and
   separating the magnetic coupling circuit devices by removing the adhesive sheet and the supporting plate.

2. A method for manufacturing RF powder composed of a large amount of particles each having a substrate and a magnetic coupling circuit device formed on an insulating film covering the substrate, comprising:
   forming a plurality of the magnetic coupling circuit devices on a wafer;
   drawing a dicing groove on a wafer surface on which the magnetic coupling circuit devices are formed to locate a position of separation of the magnetic coupling circuit devices;
   coating a surrounding area of the magnetic coupling circuit devices with a protection film;
   attaching a wafer foreside on which the protection film is formed to a supporting plate;
   grinding a backside of the wafer until the wafer has a predetermined thickness;
   etching the backside of the wafer until the dicing groove is reached; and
   separating the magnetic coupling circuit devices by removing the supporting plate.

3. The method for manufacturing RF powder according to claim 2, further comprising attaching the wafer foreside to the supporting plate using an adhesive agent.

4. The method for manufacturing RF powder according to claim 2, further comprising attaching the wafer foreside to the supporting plate using an adhesive sheet.

5. The method for manufacturing RF powder according to claim 2, wherein etching the backside of the waver comprises wet etching.

6. The method for manufacturing RF powder according to claim 2, wherein etching the backside of the waver comprises dry etching.

7. A method for manufacturing RF powder composed of a large amount of particles each having a substrate and a magnetic coupling circuit device formed on an insulating film covering the substrate, comprising:
   forming a plurality of the magnetic coupling circuit devices on a wafer;
   coating a wafer foreside on which the magnetic coupling circuit devices are formed with a protection film;
   attaching the wafer foreside coated with the protection film to a supporting plate;
   grinding a backside of the wafer until the wafer has a predetermined thickness;
   removing the supporting plate;
   irradiating the wafer with a laser in such a manner that the laser traces a line for separation of the magnetic coupling circuit devices; and
   separating the magnetic coupling circuit devices.

8. The method for manufacturing RF powder according to claim 7, wherein irradiating the wafer with a laser comprises irradiating the wafer using light that enters the wafer as the laser, in order to exert a nonlinear absorption effect in the wafer, thereby forming an affected layer and enabling easy separation of the magnetic coupling circuit devices.

9. The method for manufacturing RF powder according to claim 1, further comprising coating the RF powder composed of the separated magnetic coupling circuit devices after the separating the magnetic coupling circuit devices.

10. The method for manufacturing RF powder according to claim 1, further comprising plating a metal portion having the magnetic coupling circuit device after formation of the magnetic coupling circuit devices.

11. The method for manufacturing RF powder according to claim 10, wherein the metal portion contains Cu and plating is performed using electroless deposition of CoWP.

12. The method for manufacturing RF powder according to claim 1, wherein the protection film is a bilayer film.

13. The method for manufacturing RF powder according to claim 12, wherein the bilayer film has a silicon oxide film and a silicon nitride film.

14. The method for manufacturing RF powder according to claim 1, wherein the protection film is made of polyimide.

* * * * *

UNITED STATES PATENT AND TRADEMARK OFFICE
CERTIFICATE OF CORRECTION

| | |
|---|---|
| PATENT NO. | : 8,178,415 B2 |
| APPLICATION NO. | : 12/516493 |
| DATED | : May 15, 2012 |
| INVENTOR(S) | : Furumura et al. |

It is certified that error appears in the above-identified patent and that said Letters Patent is hereby corrected as shown below:

On the Title Page

On Page 2, Item (56), under "OTHER PUBLICATIONS", in Column 2, Line 24, delete "Writen" and insert -- Written --, therefor.

On Page 2, Item (56), under "OTHER PUBLICATIONS", in Column 2, Line 37, delete "939'"'" and insert -- 939, --, therefor.

On Page 2, Item (56), under "OTHER PUBLICATIONS", in Column 2, Line 51, delete "Horriyak," and insert -- Hornyak, --, therefor.

On Page 2, Item (56), under "OTHER PUBLICATIONS", in Column 2, Line 53, delete "al.." and insert -- al., --, therefor.

On Page 3, Item (56), under "OTHER PUBLICATIONS", in Column 1, Line 2, delete "Writen" and insert -- Written --, therefor.

On Page 3, Item (56), under "OTHER PUBLICATIONS", in Column 1, Line 4, delete "al,," and insert -- al., --, therefor.

In the Drawings

Figure 8:
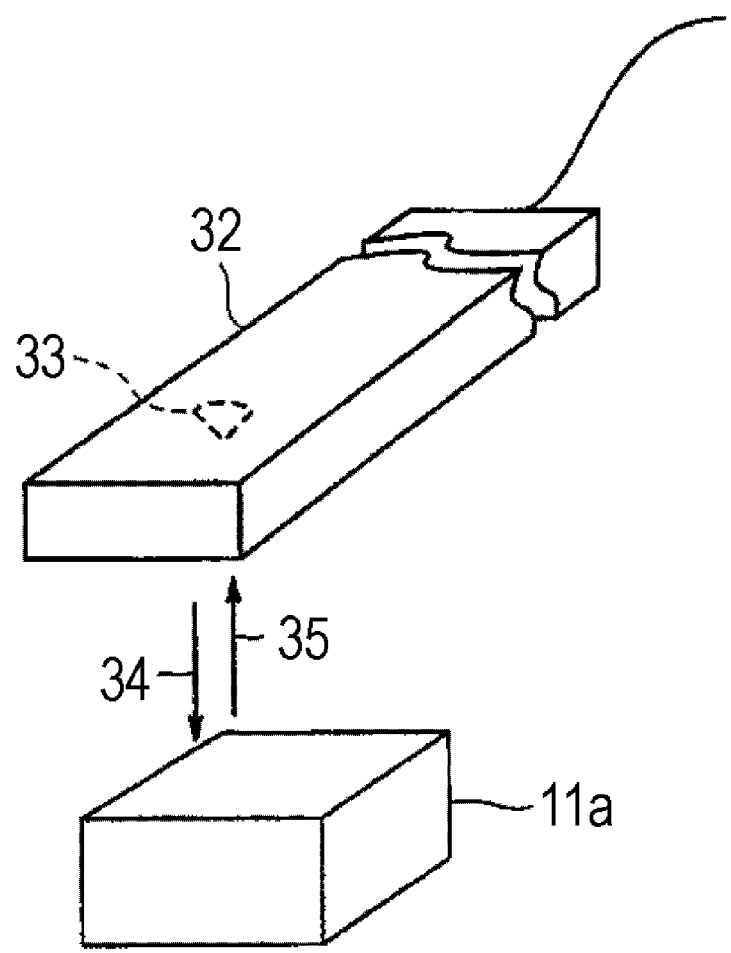
FIG. 8 is a diagram showing a two-way transmission relationship between an RF powder particle and a reader via a high-frequency magnetic field at the position of the RF powder particle.
Figure 9:
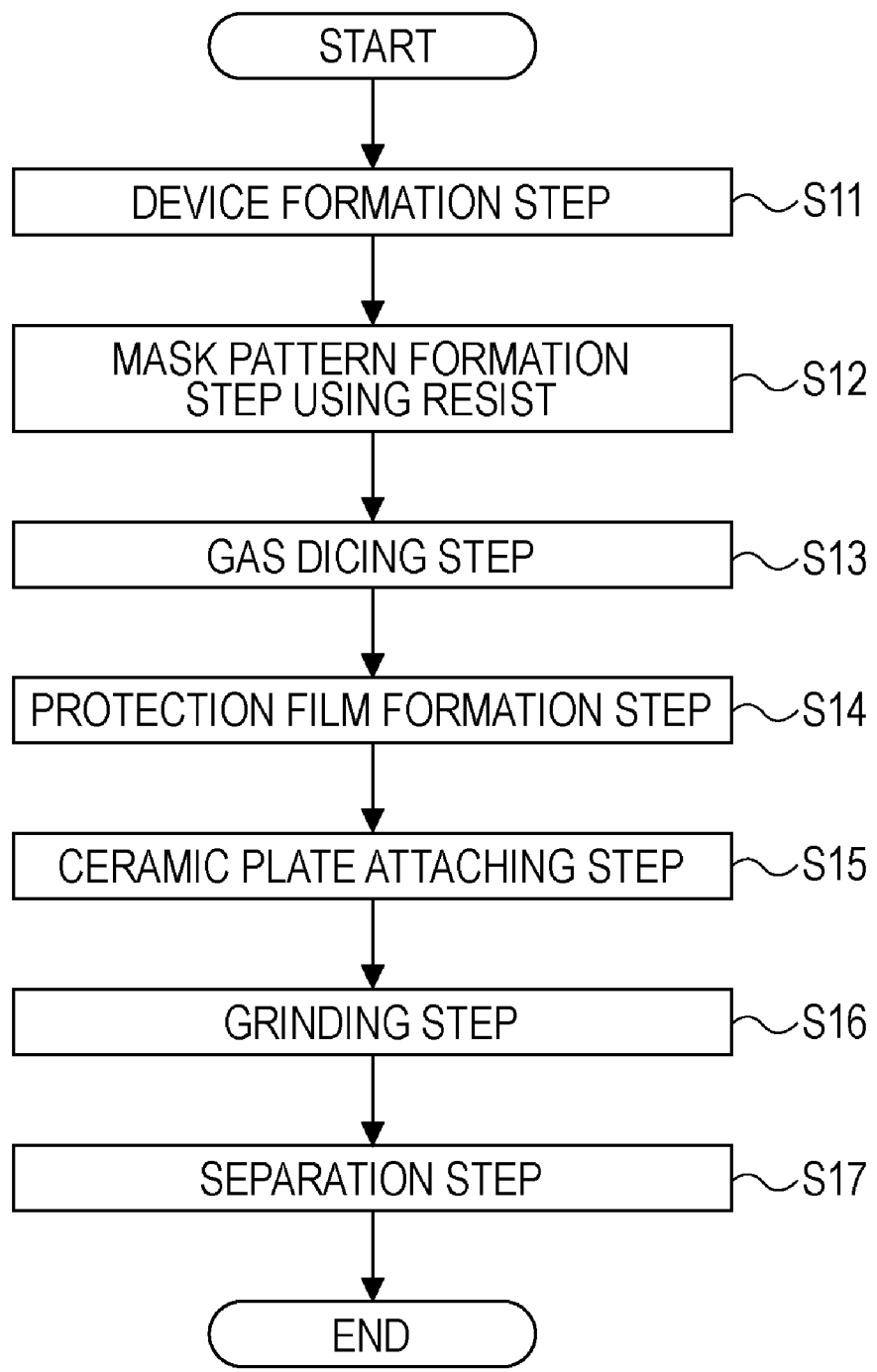
FIG. 9 is a flowchart showing the first embodiment of the method for manufacturing RF powder according to the present invention.
Figure 10:
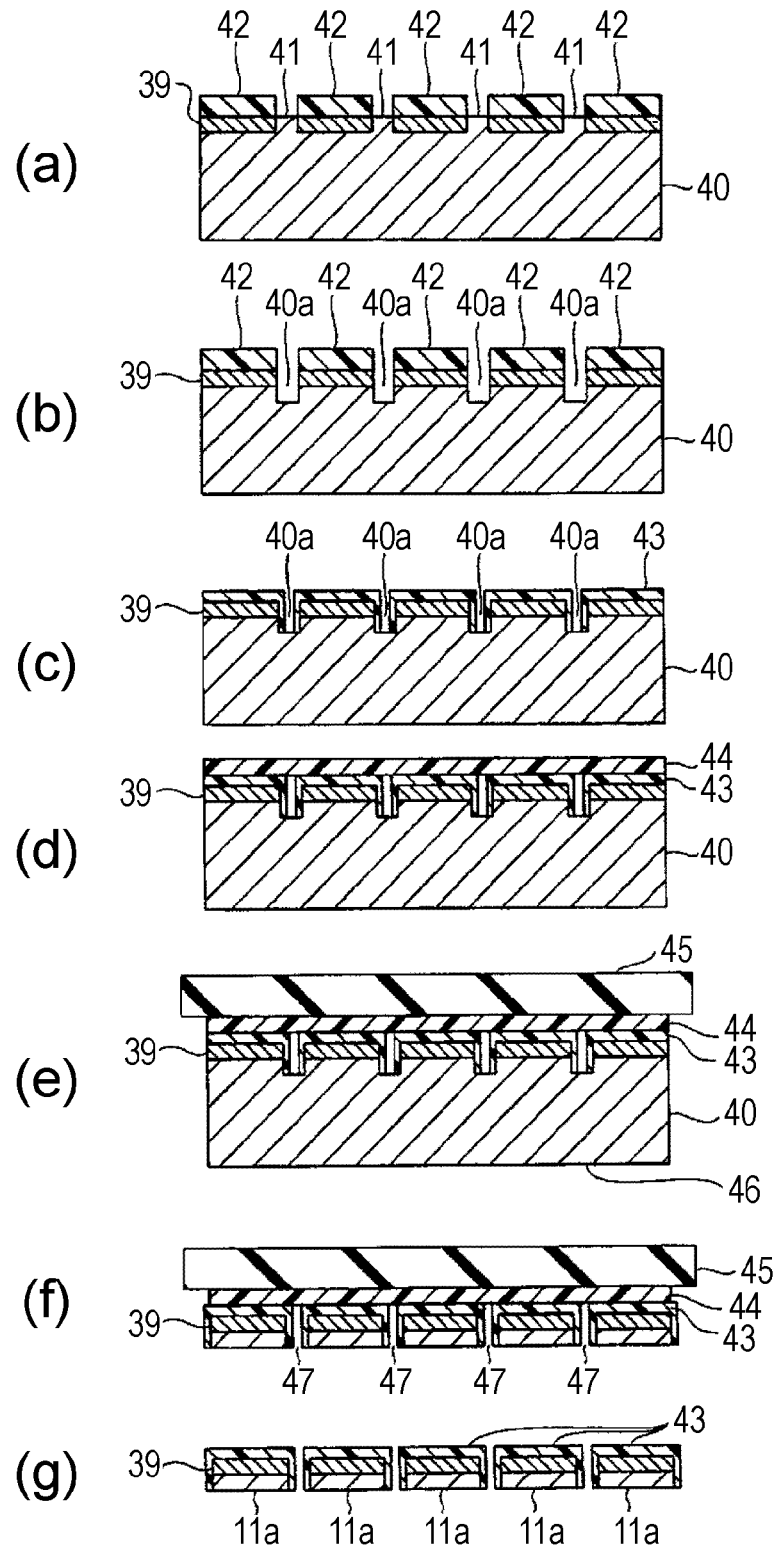
FIG. 10 includes vertical cross-sectional views of a wafer and RF powder particles corresponding to the individual steps of the first embodiment of the method for manufacturing RF powder.
Figure 11:
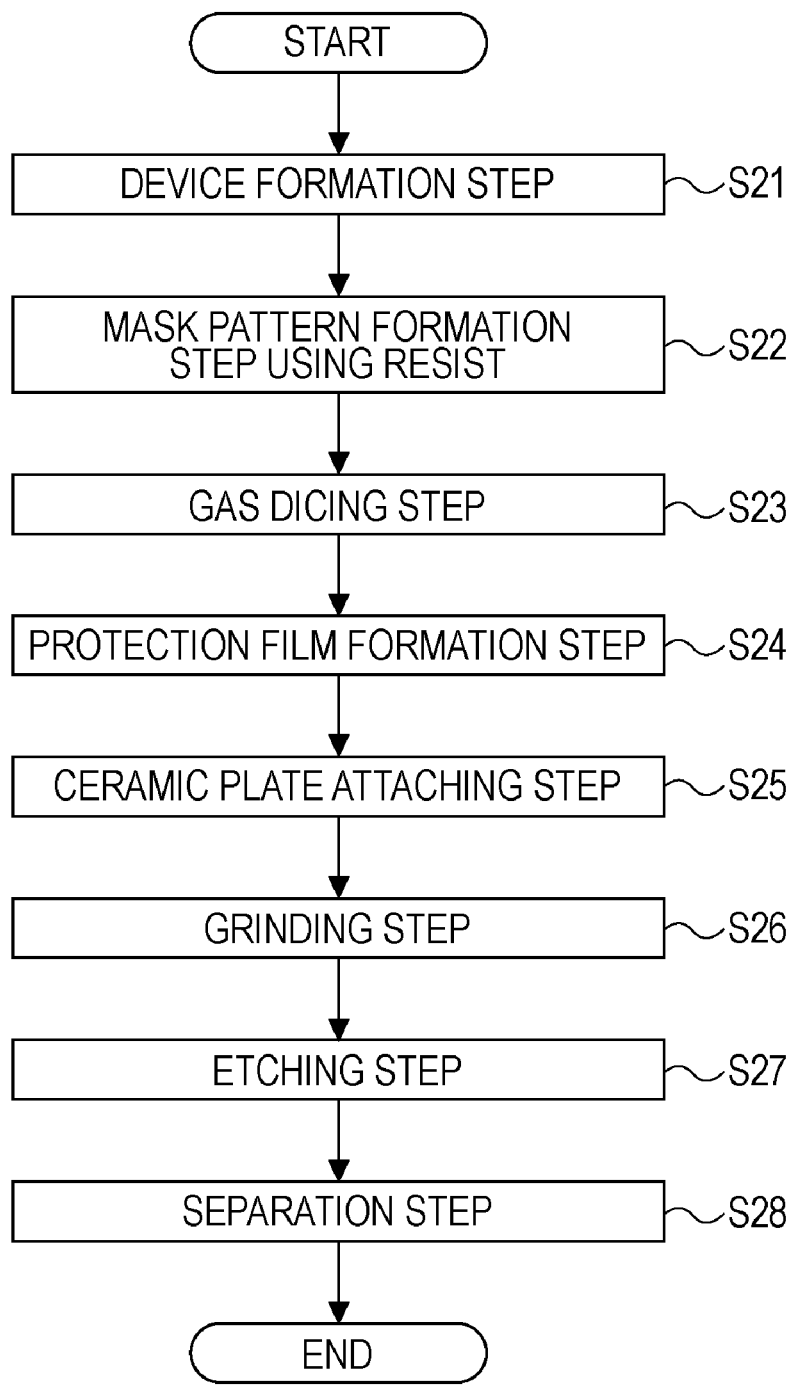
FIG. 11 is a flowchart showing the second embodiment of the method for manufacturing RF powder according to the present invention.
Figure 12:
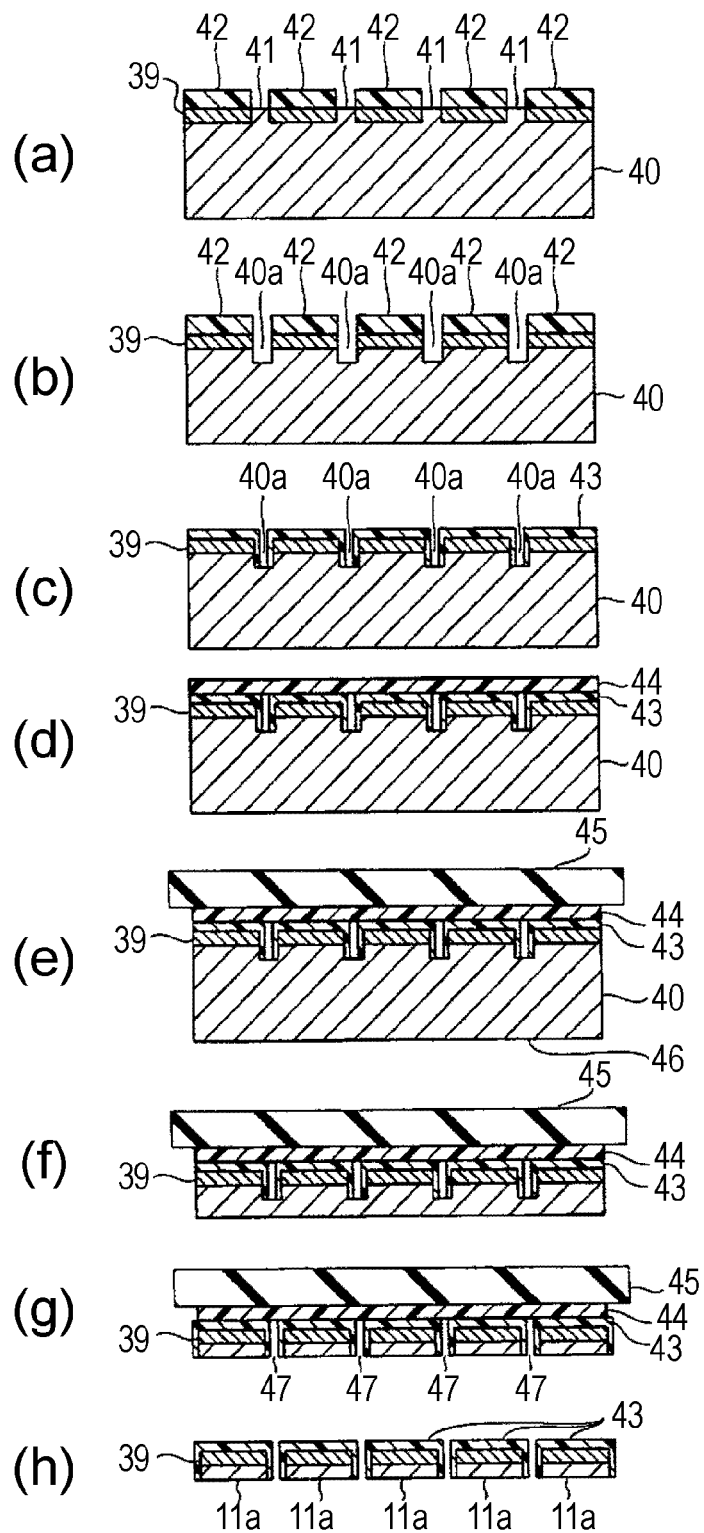
FIG. 12 includes vertical cross-sectional views of a wafer and RF powder particles corresponding to the individual steps of the second embodiment of the method for manufacturing RF powder.
Figure 13:
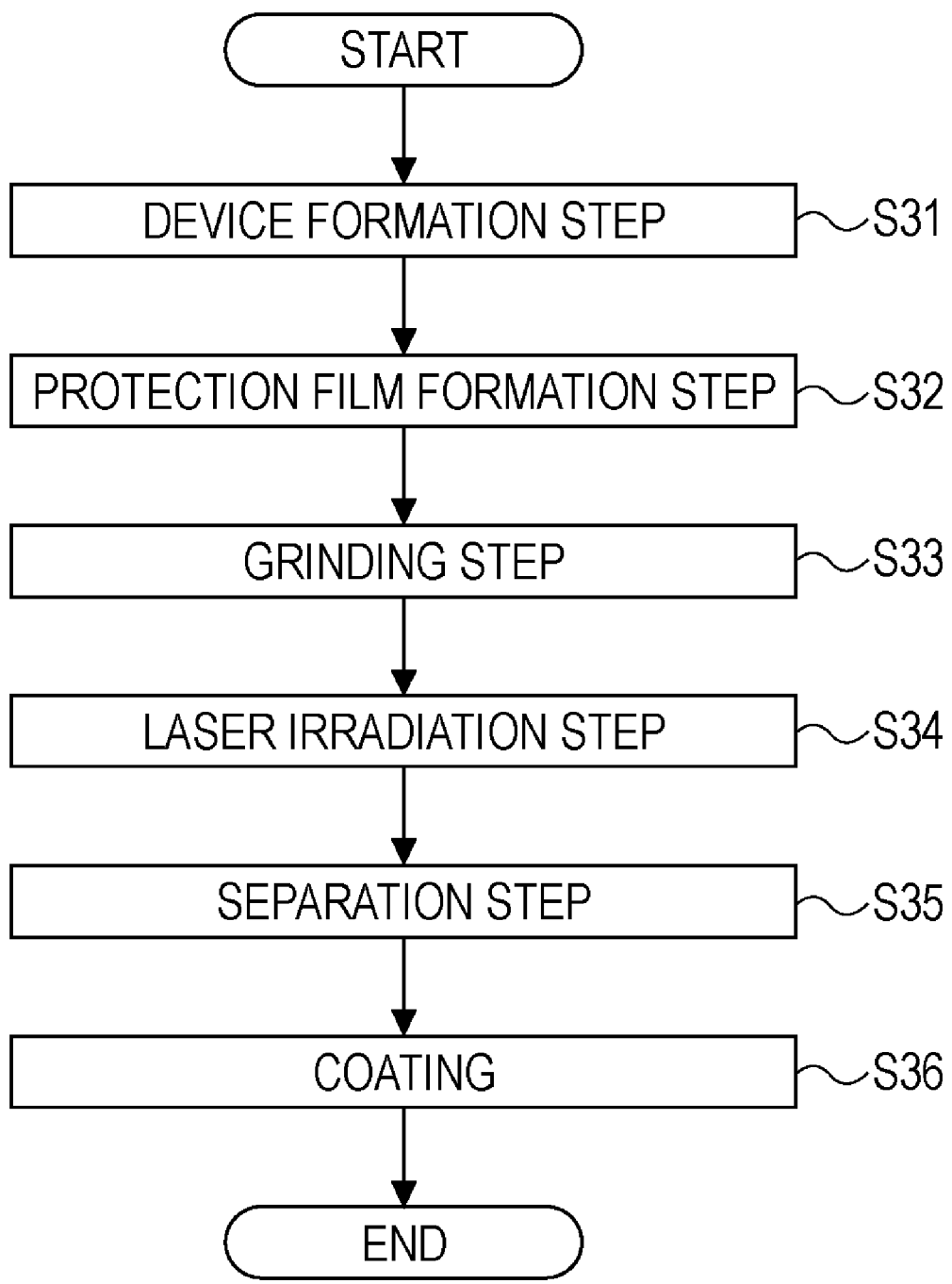
FIG. 13 is a flowchart showing the third embodiment of the method for manufacturing RF powder according to the present invention.
Figure 14:
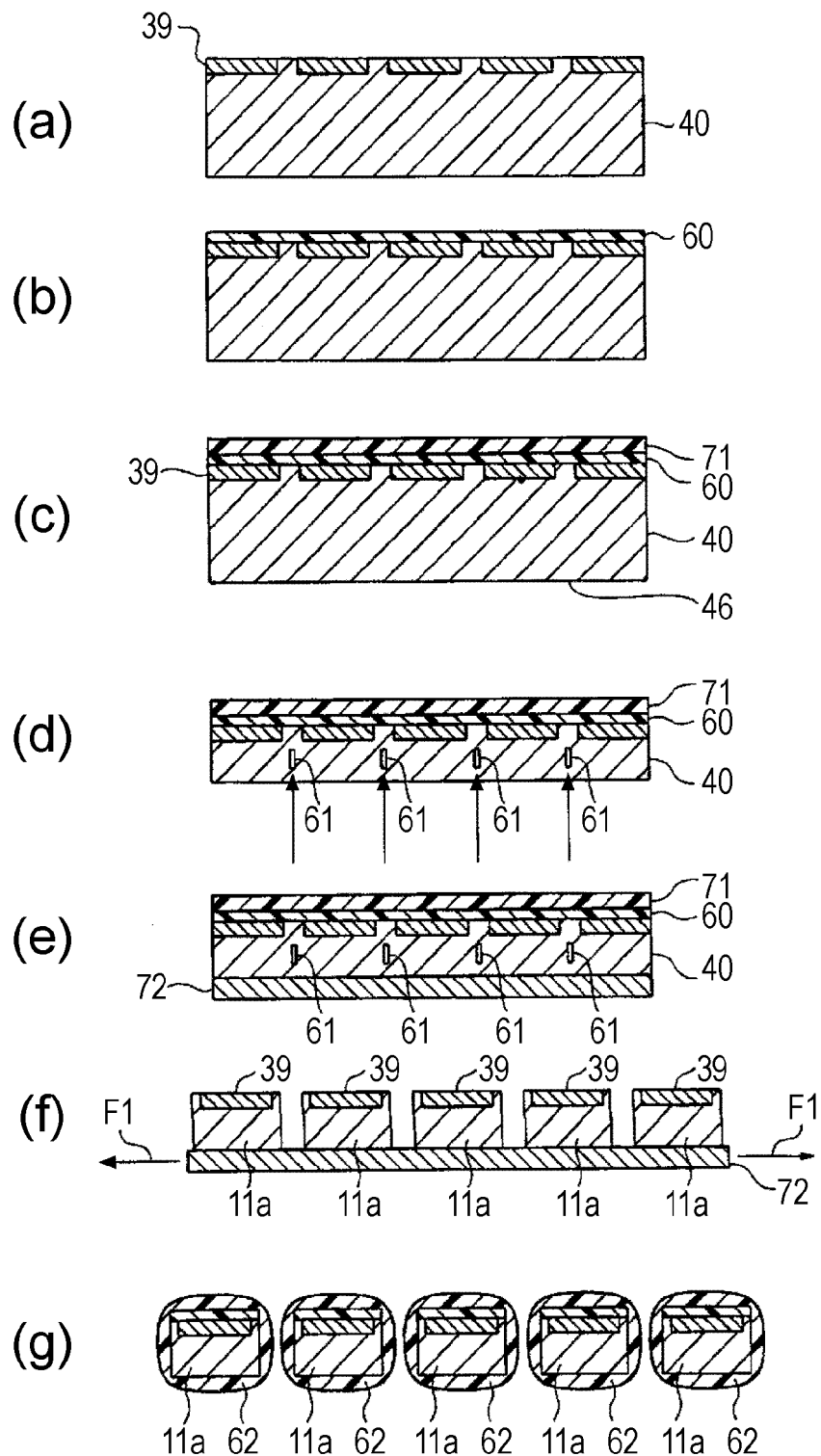
FIG. 14 includes vertical cross-sectional views of a wafer and RF powder particles corresponding to the individual steps of the third embodiment of the method for manufacturing RF powder.

In Fig. 8, Sheet 7 of 13, delete " 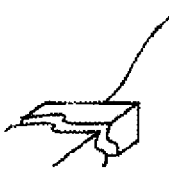 " and insert --  --, therefor.

Signed and Sealed this
Eighth Day of April, 2014

Michelle K. Lee
*Deputy Director of the United States Patent and Trademark Office*

CERTIFICATE OF CORRECTION (continued)
U.S. Pat. No. 8,178,415 B2

In the Specification

In Column 1, Line 49, delete "2003-179005" and insert -- 2003-179005. --, therefor.

In Column 1, Line 52, delete "(2004)" and insert -- (2004). --, therefor.

In the Claims

In Column 14, Line 16, in Claim 5, delete "waver" and insert -- wafer --, therefor.

In Column 14, Line 19, in Claim 6, delete "waver" and insert -- wafer --, therefor.

UNITED STATES PATENT AND TRADEMARK OFFICE
CERTIFICATE OF CORRECTION

PATENT NO.        : 8,178,415 B2
APPLICATION NO.   : 12/516493
DATED             : May 15, 2012
INVENTOR(S)       : Yuji Furumura et al.

It is certified that error appears in the above-identified patent and that said Letters Patent is hereby corrected as shown below:

On the title page, Item (75), under "Inventors", on Line 2, delete "Tokyo (JP);" and insert -- Chiyoda, Tokyo (JP); --, therefor.

Signed and Sealed this
Thirtieth Day of September, 2014

Michelle K. Lee
*Deputy Director of the United States Patent and Trademark Office*